(12) United States Patent
Murasaki et al.

(10) Patent No.: US 9,974,364 B2
(45) Date of Patent: May 22, 2018

(54) SEAT BELT DEVICE

(71) Applicant: KABUSHIKI KAISHA TOKAI-RIKA-DENKI-SEISAKUSHO, Aichi-ken (JP)

(72) Inventors: Tatsuhiro Murasaki, Aichi-ken (JP); Takuhiro Saito, Aichi-ken (JP); Makoto Matsuzaki, Aichi-ken (JP); Koji Hayashi, Aichi-ken (JP); Hiroto Tanaka, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 24 days.

(21) Appl. No.: 15/097,844

(22) Filed: Apr. 13, 2016

(65) Prior Publication Data
US 2016/0304050 A1 Oct. 20, 2016

(30) Foreign Application Priority Data

Apr. 17, 2015 (JP) .................................. 2015-085068

(51) Int. Cl.
| | |
|---|---|
| *B60R 22/03* | (2006.01) |
| *B60R 22/20* | (2006.01) |
| *A44B 11/25* | (2006.01) |
| *B60R 22/22* | (2006.01) |
| *B60R 22/26* | (2006.01) |

(Continued)

(52) U.S. Cl.
CPC .......... *A44B 11/2561* (2013.01); *B60R 22/03* (2013.01); *B60R 22/20* (2013.01); *B60R 22/22* (2013.01); *B60R 22/26* (2013.01); *B60R 2022/021* (2013.01); *B60R 2022/1806* (2013.01); *B60R 2022/208* (2013.01)

(58) Field of Classification Search
CPC ......... B60R 22/03; B60R 22/20; B60R 22/22; B60R 22/24; B60R 22/26; B60R 22/201; B60R 2022/1806; B60R 2022/021; B60R 2022/208
USPC ........... 280/801.1, 806, 801.2; 297/468, 480, 297/481, 482; 180/268
See application file for complete search history.

(56) References Cited

U.S. PATENT DOCUMENTS 6,315,328 B1 * 11/2001 Iseki ..................... B60R 22/24
280/808

FOREIGN PATENT DOCUMENTS

| JP | H6-59172 | * | 8/1994 |
|---|---|---|---|
| JP | 2006-131090 A1 | | 5/2006 |

* cited by examiner

*Primary Examiner* — Keith J Frisby
(74) *Attorney, Agent, or Firm* — Roberts Mlotkowski Safran Cole & Calderon P.C.

(57) ABSTRACT

In a seat belt device, when a buckle cover is moved obliquely upward in a vehicle forward direction relative to a buckle guide and the buckle cover reaches a moving endpoint at a vehicle upper side relative to the buckle guide, cover-side engagement portions of the buckle cover become sandwiched between vehicle lower side surfaces of guide-side engagement portions of the buckle guide, and the outside surfaces of guide long-side wall portions of the buckle guide. Due to this, not only movement of the cover-side engagement portions of the buckle cover in the vehicle upward direction but also movement of the cover-side engagement portions outwards in the thickness directions of the cross-sectional shapes of the buckle cover and the buckle guide are restrained by the guide-side engagement portions.

8 Claims, 5 Drawing Sheets

(51) Int. Cl.
  *B60R 22/18* (2006.01)
  *B60R 22/02* (2006.01)

SEAT BELT DEVICE

CROSS-REFERENCE TO RELATED APPLICATION

This application claims priority under 35 USC 119 from Japanese Patent Application No. 2015-085068 filed Apr. 17, 2015, the disclosure of which is incorporated by reference herein.

BACKGROUND

Field of the Invention

The present invention relates to a seat belt device in which a tongue or a buckle is moved.

Related Art

There is a seat belt device where, in order to make it easier for an occupant to engage a tongue to a buckle, a moving member is guided by a support member and moved toward a vehicle upper side to thereby directly or indirectly cause the tongue to move toward the vehicle upper side (e.g., see Japanese Patent Application Laid-open (JP-A) No. 2006-131090). There may be the potential for this moving member to come away from the support member due to being pushed in the vehicle forward and rearward direction side or the vehicle width direction side in a case where the moving member has reached a moving endpoint.

SUMMARY

In consideration of the circumstances described above, a seat belt device that can restrain the moving member from coming away from the support member is obtained.

A seat belt device pertaining to a first aspect includes: a buckle with which a tongue provided at a webbing is engaged; a moving member that is movable together with the tongue or the buckle; a support member that movably supports the moving member; and a restraining portion that is provided at one of the moving member or the support member, the restraining portion and the one of the moving member or the support member sandwiching another of the moving member or the support member to thereby restrain the moving member from coming away from the support member in a case in which the moving member reaches a moving endpoint of the moving member.

In the seat belt device pertaining to the first aspect, in the case where the moving member has reached the moving endpoint of the moving member relative to the support member, the another of the moving member or the support member becomes sandwiched by the one of the moving member or the support member and the restraining portion provided on the one of the moving member or the support member. Due to this, the moving member can be restrained from coming away from the support member.

A seat belt device pertaining to a second aspect of the present invention is the seat belt device pertaining to the first aspect, further including a reinforcement member that is provided in the restraining portion and reinforces the restraining portion.

In the seat belt device pertaining to the second aspect, the restraining portion is reinforced by the reinforcement member, so in a case where the moving member has been moved the most in the vehicle upward direction relative to the support member, deformation of the restraining portion due to a load applied to the moving member can be suppressed, and the moving member can be effectively restrained from coming away from the support member.

A seat belt device pertaining to a third aspect of the present invention is the seat belt device pertaining to the first aspect or the second aspect, wherein a short portion and a long portion whose dimension in a direction orthogonal to a moving direction of the moving member is longer than that of the short portion are provided at the one of the moving member or the support member; and the restraining portion is provided at the long portion.

In the seat belt device pertaining to the third aspect, the short portion and the long portion whose dimension in the direction orthogonal to the moving direction of the moving member is longer than that of the short portion are provided in the one of the moving member or the support member, and the restraining portion is provided on the long portion. For this reason, a range of the restraining portion can be enlarged compared to a case where the restraining portion is provided on the short portion.

A seat belt device pertaining to a fourth aspect of the present invention is the seat belt device pertaining to the third aspect, wherein restraining portions are provided at a pair of long portions respectively.

In the seat belt device pertaining to the fourth aspect, the long portion whose dimension in the direction orthogonal to the moving direction of the moving member is longer than that of the short portion is provided as a pair in the one of the moving member or the support member, and the restraining portions are provided on the pair of long portions. For this reason, the moving member can be more effectively restrained from coming away from the support member.

A seat belt device pertaining to a fifth aspect of the present invention is the seat belt device pertaining to any one of the first aspect to the fourth aspect, further including a guide member that is engaged with the restraining portion and guides the moving member.

In the seat belt device pertaining to the fifth aspect, the guide member is engaged with the restraining portion. Due to this, the moving member can be guided in its moving direction.

In the seat belt device pertaining to the aspects, the restraining portion is a one-side engagement portion that protrudes from the one of the moving member or the support member toward a side of the another of the moving member or the support member; an another side engagement portion is provided at the another of the moving member or the support member, the another side engagement portion protruding from the another of the moving member or the support member toward a side of the one of the moving member or the support member; the one side engagement portion and the another side engagement portion are provided so as to face each other in a moving direction of the moving member; and in the case in which the moving member reaches the moving endpoint of the moving member, the one side engagement portion and the one of the moving member or the support member sandwich the another side engagement portion.

As described above, in the seat belt device pertaining to the aspects, the moving member can be restrained from coming away from the support member.

BRIEF DESCRIPTION OF THE DRAWINGS

An exemplary embodiment will be described with reference to the following figures, wherein.

DETAILED DESCRIPTION

Figure 1:
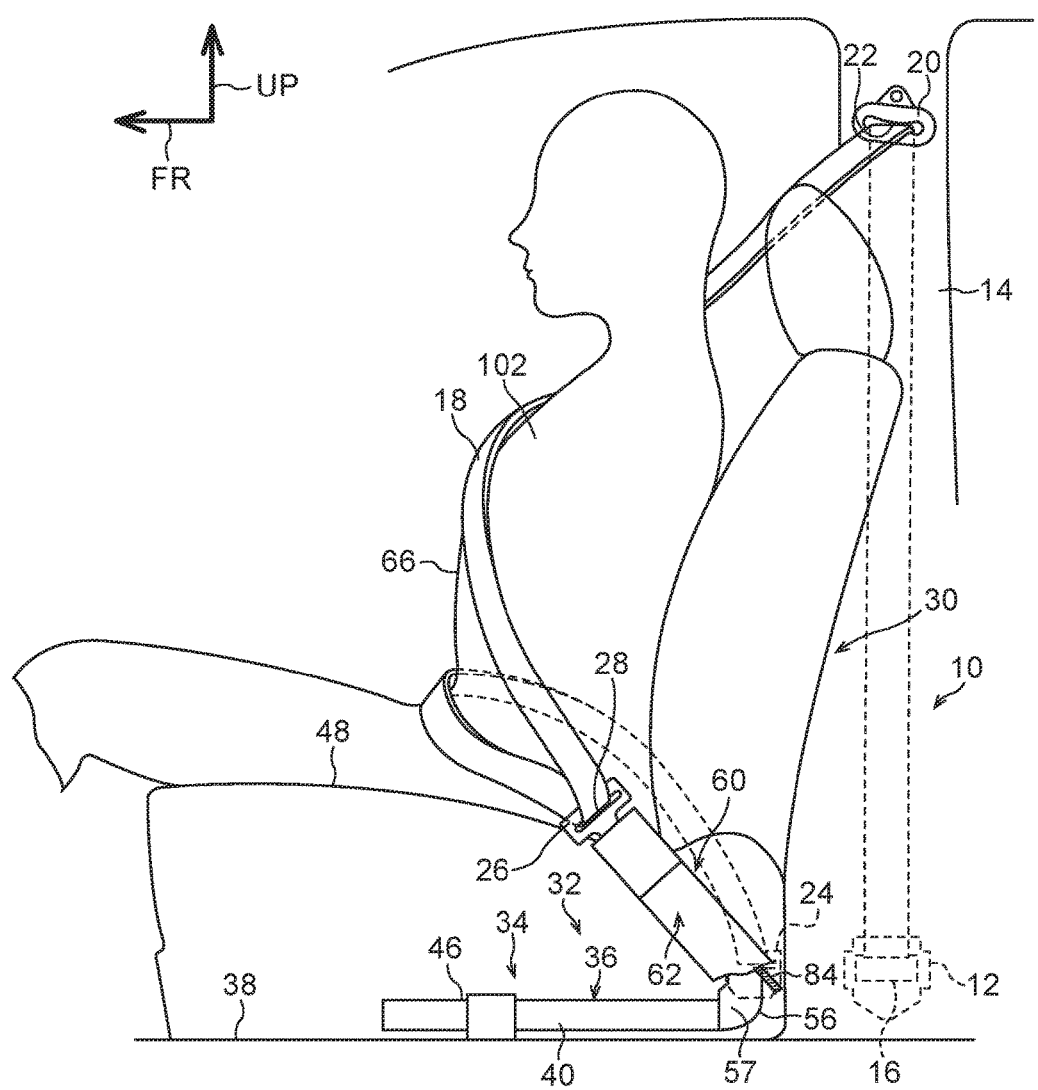
FIG. 1 is a side view, seen from inside in a vehicle width direction, of a seat belt device pertaining to the exemplary embodiment.

An exemplary embodiment will be described on the basis of FIG. 1 to FIG. 6A and FIG. 6B. It should be noted that, in the drawings, arrow FR indicates a vehicle forward direction of a vehicle to which a seat belt device 10 has been applied, arrow OUT indicates an outward direction in the vehicle width direction, and arrow UP indicates a vehicle upward direction.

Configuration of the Exemplary Embodiment

As shown in FIG. 1, the seat belt device 10 pertaining to the present embodiment is provided with a webbing take-up device 12. The webbing take-up device 12 is fixed to a vehicle body on the vehicle lower side of a center pillar 14 of the vehicle. Furthermore, the webbing take-up device 12 is provided with a spool 16. A direction of the central axis of the spool 16 lies along the vehicle forward and rearward direction, and the spool 16 is rotatable about its central axis. A longitudinal direction base end portion of long band-like webbing 18 is anchored to the spool 16, and the webbing 18 is taken up on the outer peripheral portion of the spool 16. Furthermore, the webbing take-up device 12 is provided with a spool urging member such as a spiral spring, and the spool 16 is urged by the spool urging member in a take-up direction, which is a rotational direction when taking up the webbing 18.

Furthermore, the webbing take-up device 12 is provided with a lock mechanism (not shown in the drawings). The lock mechanism is activated at the time of a vehicle emergency such as at the time of a vehicle crash. When the lock mechanism is activated, the rotation of the spool 16 of the webbing take-up device 12 in a pull-out direction, which is the opposite direction of the take-up direction, is inhibited by the lock mechanism so that the pulling-out of the webbing 18 from the spool 16 is inhibited.

Moreover, the webbing take-up device 12 is provided with a pretensioner (not shown in the drawings). The pretensioner is activated at the time of a vehicle emergency such as at the time of a vehicle crash. When the pretensioner is activated, the spool 16 of the webbing take-up device 12 is rotated in the take-up direction by the pretensioner so that the webbing 18 is taken up on the spool 16.

A through anchor 20 is provided on the vehicle upper side of the webbing take-up device 12. The through anchor 20 is supported on the vehicle body in the neighborhood of the vehicle upper side end portion of the center pillar 14. A slit hole 22 is formed in the through anchor 20, and a longitudinal direction distal end side of the webbing 18 pulled out from the spool 16 of the webbing take-up device 12 is passed through the slit hole 22 in the through anchor 20 and turned back toward the vehicle lower side.

Furthermore, an anchor plate 24 is provided in the neighborhood of the vehicle lower side end portion of the center pillar 14. The distal end portion of the webbing 18 passed through the slit hole 22 in the through anchor 20 and turned back toward the vehicle lower side is anchored to the anchor plate 24. A tongue 26 is provided in a section of the webbing 18 between the anchor plate 24 and the through anchor 20. A slit-like webbing insertion hole 28 is formed in the tongue 26, and the webbing 18 is inserted through the webbing insertion hole 28. Because of this, the tongue 26 can move along the webbing 18.

Figure 2:
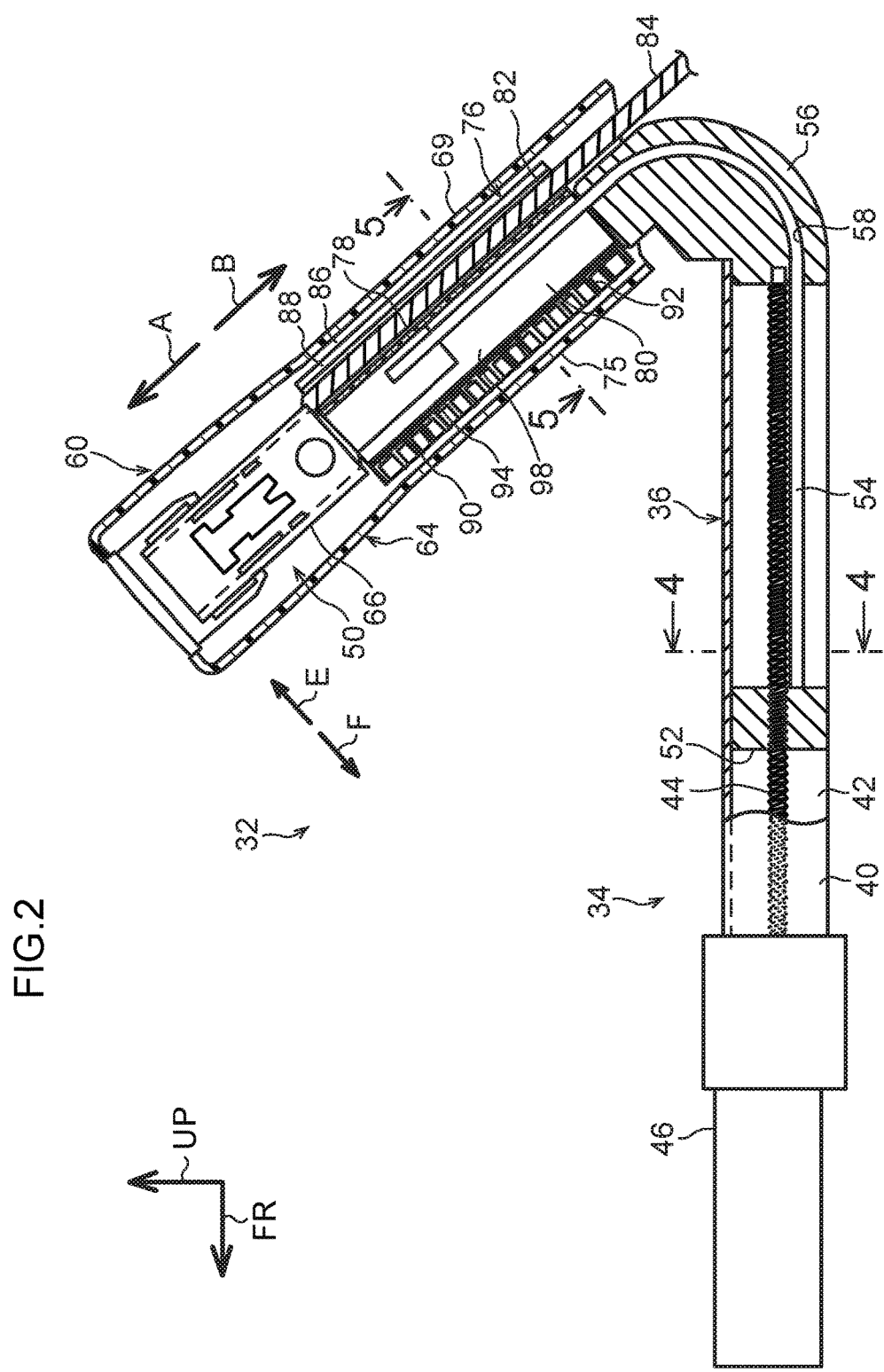
FIG. 2 is a side view, seen from inside in the vehicle width direction, of the seat belt device pertaining to the exemplary embodiment.

A buckle device 32 is provided on the vehicle width direction inside of a vehicle seat 30 to which the seat belt device 10 is applied. The buckle device 32 is provided with a buckle drive device 34. The buckle drive device 34 is provided with a frame 36 serving as a slider guide mechanism. The frame 36 is fixed to the vehicle body, such as a floor portion 38 of the vehicle or a skeletal member of the seat 30, by fastening members such as bolts. As shown in FIG. 2, the frame 36 is provided with a pair of guide walls 40 and 42 that serve as slider guide portion and that oppose each other in the vehicle width direction, and a drive screw 44 serving as a drive section is provided between the guide walls 40 and 42. The direction of the central axis of the drive screw 44 lies along the vehicle forward and rearward direction, and the drive screw 44 is configured to freely rotate about its central axis.

A motor actuator 46 serving as a drive force output section is provided on the vehicle front side of the frame 36. The vehicle front side end portion of the drive screw 44 is coupled to the motor actuator 46, and the drive screw 44 is rotated about its central axis by drive force that is output from a motor of the motor actuator 46. The motor actuator 46 is electrically connected to a control unit (not shown in the drawings) such as a motor driver and an ECU. The control unit is electrically connected to a detection component, such as a door opening and closing detection component such as a courtesy switch that detects the opening and closing of the door of the vehicle corresponding to the seat 30 to which the seat belt device 10 is applied and/or an occupant detection component such as a load sensor provided in a seat cushion 48 of the seat 30. Moreover, the control unit is electrically connected to a buckle switch (not shown in the drawings) that is provided in a later-described buckle 50 and detects that the tongue 26 is engaged with the buckle 50. The motor actuator 46 is controlled on the basis of electrical signals that are output from the buckle switch and the detection component such as the door opening and closing detection component and the occupant detection component, and the like.

Figure 4:
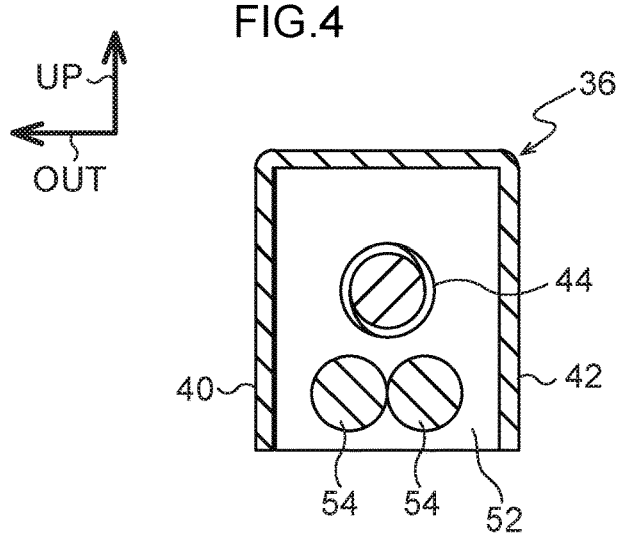
FIG. 4 is a cross-sectional view along line 4-4 of FIG. 2.

A slider 52 is provided between the guide wall 40 and the guide wall 42 of the frame 36. The slider 52 is formed in the shape of a block. As shown in FIG. 4, the vehicle width direction side surfaces of the slider 52 are in abutting with the guide walls 40 and 42 of the frame 36. Furthermore, a screw hole through which the drive screw 44 penetrates is formed in the slider 52. By the drive screw 44 rotating, the slider 52 is guided by the guide walls 40 and 42 and slid in the vehicle forward and rearward direction.

Furthermore, as shown in FIG. 2, the buckle device 32 is provided with a pair of wire ropes 54 serving as coupling member. The wire ropes 54 are formed in long shapes and, as shown in FIG. 4, are arranged adjacent to each other in the vehicle width direction. As shown in FIG. 2, in sections of the wire ropes 54, on the base end sides than their longitudinal direction middle portions, the longitudinal direction of the wire ropes 54 lies along the vehicle forward and rearward direction, and the longitudinal direction base end portions of the wire ropes 54 are coupled to the slider 52 on the vehicle lower side of the drive screw 44. Due to this, when the slider 52 is slid in the vehicle forward and rearward direction, the wire ropes 54 are moved in their longitudinal direction.

Moreover, a wire guide 56 is provided on the vehicle rear side of the frame 36. A wire guide groove 58 is formed in the wire guide 56. The wire guide groove 58 opens at the vehicle width direction outside surface of the wire guide 56 and is closed off by a plate-like cover member 57 (see FIG. 1) provided on the vehicle width direction outside of the wire guide 56. Furthermore, one longitudinal direction end of the wire guide groove 58 opens at the vehicle front side surface of the wire guide 56. Moreover, the wire guide groove 58 is curved in its longitudinal direction middle portion in a direction about an axis whose axial direction is along the vehicle width direction, and the longitudinal direction other end of the wire guide groove 58 opens at the vehicle upper side surface of the wire guide 56. The wire ropes 54 are passed through the wire guide groove 58, and sections of the wire ropes 54 on the distal end sides than their longitudinal direction middle portions extend obliquely upward in the vehicle forward direction (the direction of arrow A in FIG. 2) from the longitudinal direction other end of the wire guide groove 58.

The buckle device 32 is provided with a buckle cover 60 serving as a moving member. The buckle cover 60 is provided with a first cover member 62 and a second cover member 64. The first cover member 62 and the second cover member 64 are made of a synthetic resin material. The buckle cover 60 is formed as a result of the first cover member 62 and the second cover member 64 being assembled together in the vehicle width direction and integrated. In a state in which the first cover member 62 and the second cover member 64 have been assembled together, the buckle cover 60 has a tubular shape whose longitudinal direction lies along a direction tilting in the vehicle forward and rearward direction relative to the vehicle up and down direction (the direction of arrow A and the direction of arrow B in FIG. 2).

The buckle 50 is provided in the vehicle upper side section inside the buckle cover 60. The buckle 50 is provided with a buckle body 66. The buckle body 66 is formed in a cross-sectionally U-shape whose vertical walls extend inward in the vehicle width direction from both width direction end portions of a bottom plate whose longitudinal direction is substantially the same direction as the longitudinal direction of the buckle cover 60. Constituent parts (not shown in the drawings) of the buckle 50, such as a latch, are provided inside the buckle body 66. When the tongue 62 is inserted between both vertical walls of the buckle body 66 obliquely from the vehicle upper side and vehicle front side of the buckle body 66, the latch enters a hole portion formed in the tongue 26, due to this, the tongue 26 becomes engaged with the buckle 50.

Figure 5:
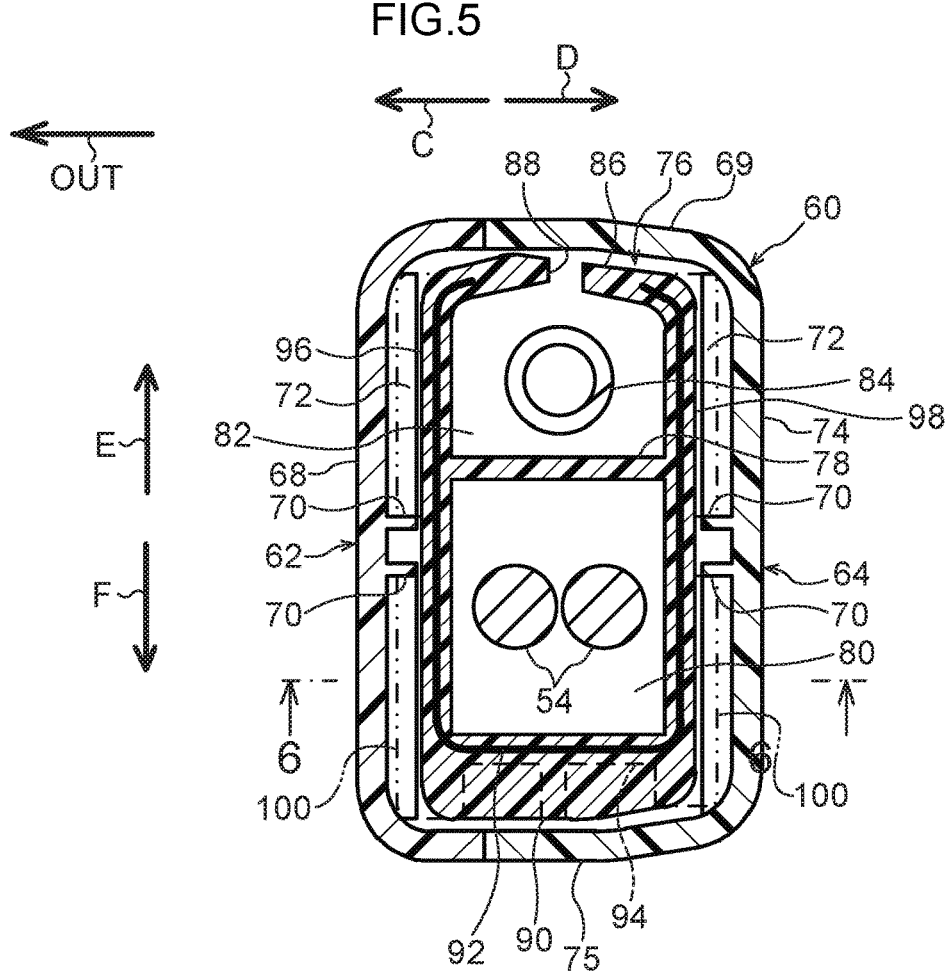
FIG. 5 is a cross-sectional view along line 5-5 of FIG. 2.

Furthermore, as shown in FIG. 5, the cross-sectional shape of the longitudinal direction middle portion of the buckle cover 60 as cut in a direction orthogonal to the longitudinal direction of the buckle cover 60 is substantially rectangular. The buckle cover 60 is provided with cover long-side wall portions 68 and 74, which serve as a pair of long portions, and cover short-side wall portions 69 and 75, which serve as a pair of short portions whose dimension is shorter than that of the cover long-side wall portions 68 and 74. The thickness direction of the buckle cover 60 (the direction of arrow C and the direction of arrow D in FIG. 5) lies along the vehicle width direction, and a pair of guide ribs 70 serving as guide member are formed on the cover long-side wall portion 68 which is at one thickness direction side (the side in the direction of arrow C in FIG. 5) of the buckle cover 60.

Figure 3:
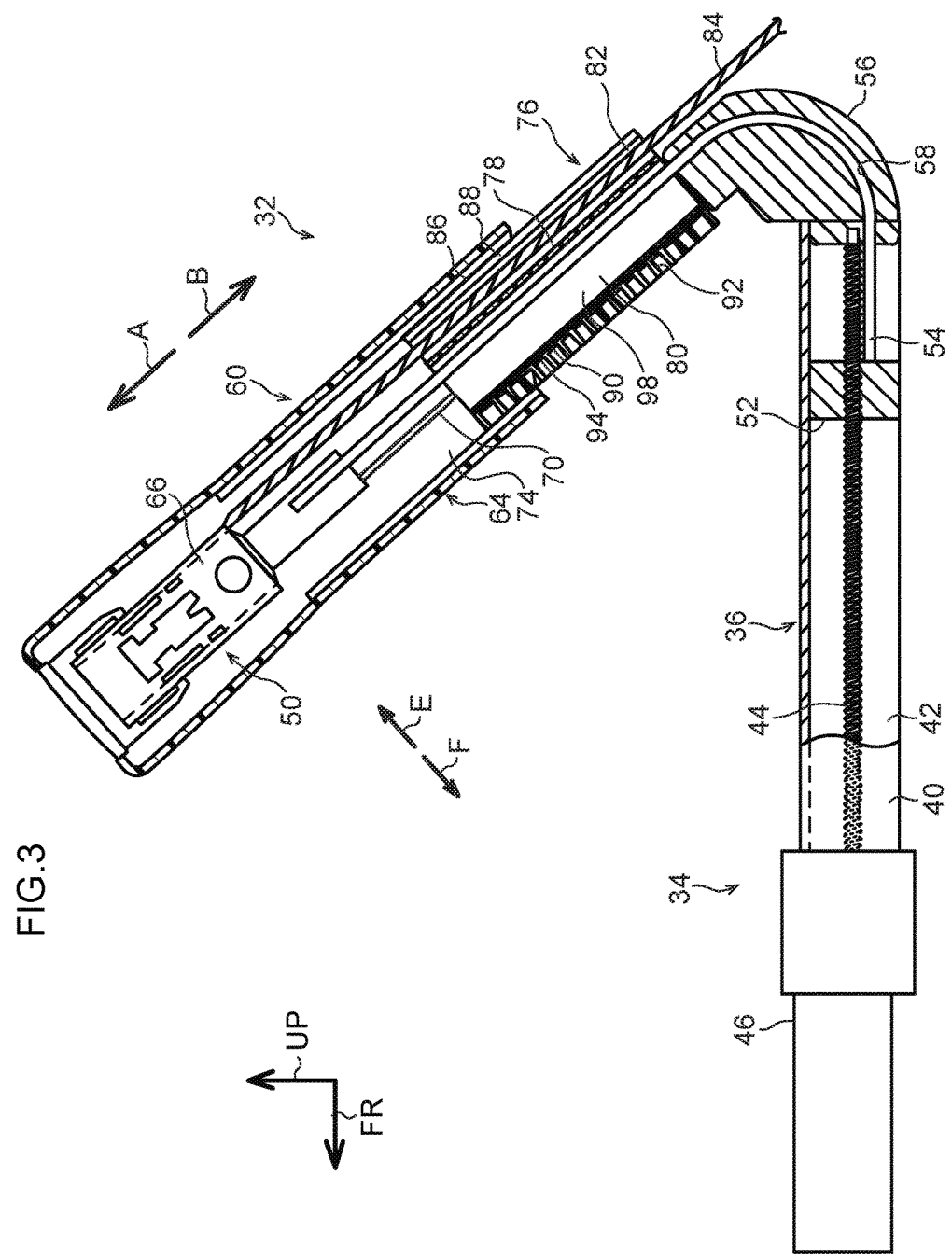
FIG. 3 is a side view, corresponding to FIG. 2, showing a state in which a buckle cover has been moved relative to a buckle guide.

The pair of guide ribs 70 are formed so as to be narrow width plates that are long in the longitudinal direction of the buckle cover 60 (the direction of arrow A and the direction of arrow B in FIG. 2, FIG. 3, and FIGS. 6A and 6B) and whose thickness direction lies along the width direction of the buckle cover 60 (the direction of arrow E and the direction of arrow F in FIG. 2, FIG. 3, and FIG. 5). The pair of guide ribs 70 oppose (face) each other in the width direction of the buckle cover 60. Furthermore, the pair of guide ribs 70 are formed on the cover long-side wall portion 68 in the substantially central portion thereof in the width direction of the buckle cover 60. The pair of guide ribs 70 are formed projecting inward in the thickness direction of the buckle cover 60 from the cover long-side wall portion 68.

Figure 6A:
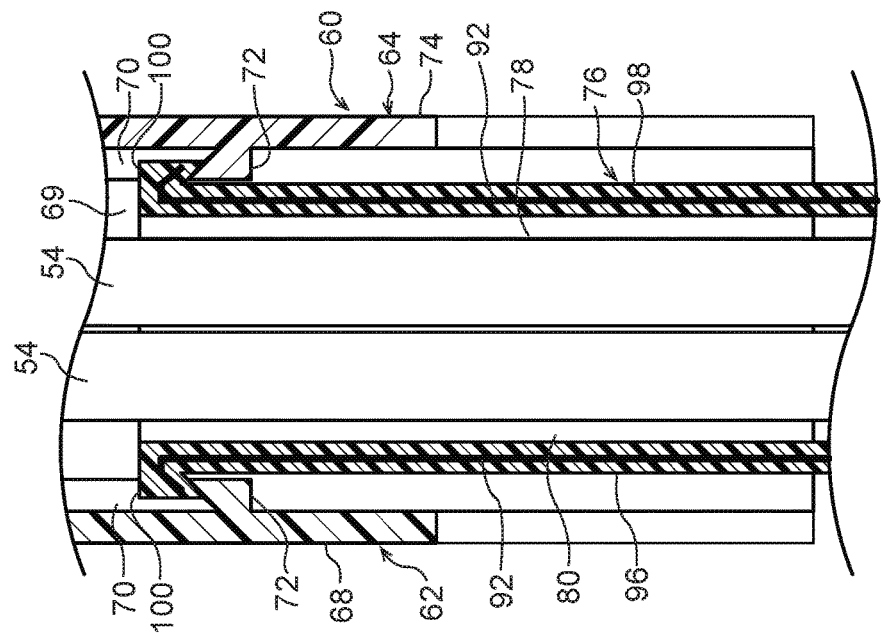
FIG. 6A and FIG. 6B are cross-sectional views along line 6-6 of FIG. 5, with FIG. 6A showing a state before the buckle cover is moved and FIG. 6B showing a state in which the buckle cover has been moved to a moving endpoint.

Moreover, cover-side engagement portions 72 are formed on the cover long-side wall portion 68 of the buckle cover 60. The cover-side engagement portions 72 are formed at both sides in the width direction of the buckle cover 60 with respect to the vehicle lower side end portions of the pair of guide ribs 70. As shown in FIG. 6A, the cover-side engagement portions 72 are formed projecting inward in the thickness direction of the buckle cover 60 (the direction of arrow D in FIG. 6A) from the cover long-side wall portion 68 of the buckle cover 60. The direction of the vehicle upper side surfaces of the cover-side engagement portions 72 slopes outward in the thickness direction of the buckle cover 60 (the direction of arrow C in FIG. 6A) relative to the longitudinal direction upper side of the buckle cover 60 (the side in the direction of arrow A in FIG. 6A).

Namely, the vehicle upper side surfaces of the cover-side engagement portions 72 slope from the cover long-side wall portion 68 of the buckle cover 60 in a direction toward inside in the thickness direction of the buckle cover 60 (the direction of arrow D in FIG. 6A) and upper side in the longitudinal direction of the buckle cover 60 (the direction of arrow A in FIG. 6A). Furthermore, as shown in FIG. 5 and FIG. 6A, like on the cover long-side wall portion 68 on the one thickness direction side of the buckle cover 60, a pair of guide ribs 70 and cover-side engagement portions 72 are formed on the cover long-side wall portion 74 on the other thickness direction side of the buckle cover 60 (the side in the direction of arrow D in FIG. 5).

As shown in FIG. 6A, the cover-side engagement portions 72 of the cover long-side wall portion 74 are formed projecting inward in the thickness direction of the buckle cover 60 (the direction of arrow C in FIG. 6A) from the cover long-side wall portion 74. The direction of the vehicle upper side surfaces of the cover-side engagement portions 72 slopes outward in the thickness direction of the buckle cover 60 (the direction of arrow D in FIG. 6A) relative to the longitudinal direction upper side of the buckle cover 60 (the side in the direction of arrow A in FIG. 6A).

Namely, the vehicle upper side surfaces of the cover-side engagement portions 72 slope from the cover long-side wall portion 74 of the buckle cover 60 in a direction toward inside in the thickness direction of the buckle cover 60 (the direction of arrow C in FIG. 6A) and upper side in the longitudinal direction of the buckle cover 60 (the direction of arrow A in FIG. 6A).

Furthermore, as shown in FIG. 2, the buckle device 32 is provided with a buckle guide 76 serving as a support member. The buckle guide 76 is made of a synthetic resin material that is more flexible than that of the first cover member 62 and the second cover member 64 configuring the buckle cover 60. The buckle guide 76 is formed in a tubular shape that is long in the longitudinal direction of the buckle cover 60 (the direction of arrow A and the direction of arrow B in FIG. 2). The vehicle lower side end portion of the buckle guide 76 is fixed to the wire guide 56 directly or indirectly via another member. Due to this, the buckle guide 76 is fixed to the vehicle body side via the wire guide 56 and the frame 36. Furthermore, as shown in FIG. 5, the cross-sectional shape of the buckle guide 76 as cut in a direction orthogonal to the longitudinal direction of the buckle guide 76 is substantially rectangular. The buckle guide 76 is provided with guide long-side wall portions 96 and 98, which serve as a pair of long portions, and guide short-side wall portions 86 and 94, which serve as a pair of short portions whose dimension is shorter than that of the guide long-side wall portions 96 and 98. The thickness direction of the buckle guide 76 (the direction of arrow C and the direction of arrow D in FIG. 5) lies along the vehicle width direction.

Moreover, a partition wall 78 is formed inside the buckle guide 76. The partition wall 78 is formed in the width direction substantially middle portion of the buckle guide 76 and is formed continuously along substantially the entire length of the buckle guide 76 in the longitudinal direction of the buckle guide 76. The partition wall 78 partitions the space inside the buckle guide 76 into a cord housing portion 82 on one width direction side of the buckle guide 76 (the side in the direction of arrow E in FIG. 5) and a wire housing portion 80 on the other width direction side of the buckle guide 76 (the side in the direction of arrow F in FIG. 5). The wire ropes 54 run through the inside the wire housing portion 80 of the buckle guide 76. The longitudinal direction distal end sides of the wire ropes 54 extend outside the buckle guide 76 from the vehicle front-upper-oblique side end portion of the buckle guide 76 and are coupled to the buckle body 66 provided in the buckle cover 60.

A curl cord (coiled cord) 84 runs through the cord housing portion 82 of the buckle guide 76. The curl cord 84 is formed in a long shape and includes at least one of a power line and a signal line covered by a synthetic resin material. Furthermore, the curl cord 84 is curl and can extend and contract in its longitudinal direction.

The longitudinal direction distal end side of the curl cord 84 extends outside the buckle guide 76 from the vehicle upper side end portion of the buckle guide 76 and is connected to the buckle switch (not shown in the drawings) of the buckle 50 provided in the buckle cover 60. Furthermore, the longitudinal direction base end side of the curl cord 84 extends outside the buckle guide 76 from the vehicle lower side end portion of the buckle guide 76. The longitudinal direction base end side of the curl cord 84 is directly or indirectly connected to a battery (not shown in the drawings) installed in the vehicle if the curl cord 84 is provided with a power line, and the longitudinal direction base end side of the curl cord 84 is directly or indirectly connected to the control unit installed in the vehicle if the curl cord 84 is provided with a signal line.

Moreover, a slit 88 is formed in the guide short-side wall portion 86 serving as a short portion of the buckle guide 76 on the one width direction side of the buckle guide 76 (the side in the direction of arrow E in FIG. 5). The slit 88 is formed along the entire length of the buckle guide 76 in the longitudinal direction of the buckle guide 76. By elastically deforming the guide short-side wall portion 86 of the buckle guide 76 in such a way as to open the slit 88, the curl cord 84 can be disposed inside the cord housing portion 82 from the guide short-side wall portion 86 side.

Furthermore, a reinforcement rib 90 is formed in the buckle guide 76. The reinforcement rib 90 is formed on the outside of the guide short-side wall portion 94 on the other width direction side of the buckle guide 76 (the side in the direction of arrow F in FIG. 5). Due to this, the rigidity of the buckle guide 76 is reinforced.

Moreover, a reinforcement plate 92 serving as a reinforcement member is provided in the buckle guide 76. The reinforcement plate 92 is made of a metal plate that is more rigid than the synthetic resin material forming the buckle guide 76. Furthermore, the reinforcement plate 92 is cross-sectionally substantially C-shaped and is embedded inside the guide short-side wall portion 94 on the other width direction side of the buckle guide 76 and inside the guide long-side wall portions 96 and 98 on both thickness direction sides of the buckle guide 76. Due to this, the rigidity of the buckle guide 76 is reinforced.

Furthermore, a pair of guide-side engagement portions 100 are formed on the guide long-side wall portion 96 which is on the one thickness direction side of the buckle guide 76 (the side in the direction of arrow C in FIG. 5). The pair of guide-side engagement portions 100 are formed on both sides of the guide long-side wall portion 96 that sandwich the width direction central portion of the buckle guide 76. As shown in FIG. 6A, the pair of guide-side engagement portions 100 extend outward in the thickness direction of the buckle guide 76 (the direction of arrow C in FIG. 6A) from the vehicle upper side end portion of the guide long-side wall portion 96 of the buckle guide 76. The direction of the vehicle lower side surfaces of the guide-side engagement portions 100 slopes inward in the thickness direction of the buckle guide 76 (the direction of arrow D in FIG. 6A) relative to the longitudinal direction lower side of the buckle guide 76 (the side in the direction of arrow B in FIG. 6A). Namely, the vehicle lower side surfaces of the guide-side engagement portions 100 slope from the guide long-side wall portion 96 of the buckle guide 76 in a direction toward outside in the thickness direction of the buckle guide 76 (the direction of arrow C in FIG. 6A) and lower side in the longitudinal direction of the buckle guide 76 (the direction of arrow B in FIG. 6A).

Furthermore, the guide-side engagement portions 100 of the guide long-side wall portion 96 of the buckle guide 76 oppose (face) the cover-side engagement portions 72 of the cover long-side wall portion 68 of the buckle cover 60 in the longitudinal direction of the buckle guide 76 and the buckle cover 60. In a state in which the buckle cover 60 reaches a moving endpoint on the vehicle upper side with respect to the buckle guide 76 (the state shown in FIG. 3), the cover-side engagement portions 72 of the cover long-side wall portion 68 of the buckle cover 60 enter between the vehicle lower side surfaces of the guide-side engagement portions 100 of the guide long-side wall portion 96 of the buckle guide 76 and the outside surface of the guide long-side wall portion 96 of the buckle guide 76, and become sandwiched between the vehicle lower side surfaces of the guide-side engagement portions 100 and the guide long-side wall portion 96.

Moreover, the pair of guide ribs 70 of the guide long-side wall portion 68 of the buckle cover 60 are between the pair of guide-side engagement portions 100 of the guide long-side wall portion 96 of the buckle guide 76, and the buckle cover 60 can move in its longitudinal direction due to the guide ribs 70 of the buckle cover 60 being guided by the pair of guide-side engagement portions 100 of the buckle guide 76.

Furthermore, as shown in FIG. 5 and FIG. 6A, like on the guide long-side wall portion 96 on the one thickness direction side, a pair of guide-side engagement portions 100 are formed on the guide long-side wall portion 98 on the other thickness direction side of the buckle guide 76 (the side in the direction of arrow D in FIG. 5). As shown in FIG. 6A, the pair of guide-side engagement portions 100 of the guide long-side wall portion 98 extend outward in the thickness direction of the buckle guide 76 (the direction of arrow D in FIG. 6A) from the vehicle upper side end portion of the guide long-side wall portion 98 of the buckle guide 76. The direction of the vehicle lower side surfaces of the guide-side engagement portions 100 of the guide long-side wall portion 98 slopes inward in the thickness direction of the buckle guide 76 (the direction of arrow C in FIG. 6A) relative to the longitudinal direction lower side of the buckle guide 76 (the side in the direction of arrow B in FIG. 6A). Namely, the vehicle lower side surfaces of the guide-side engagement portions 100 slope from the guide long-side wall portion 98 of the buckle guide 76 in a direction toward outside in the thickness direction of the buckle guide 76 (the direction of arrow D in FIG. 6A) and lower side in the longitudinal direction of the buckle guide 76 (the direction of arrow B in FIG. 6A).

Furthermore, the guide-side engagement portions 100 of the guide long-side wall portion 98 oppose (face) the cover-side engagement portions 72 of the cover long-side wall portion 74 of the buckle cover 60 in the longitudinal direction of the buckle guide 76 and the buckle cover 60. In a state in which the buckle cover 60 reaches the moving endpoint on the vehicle upper side of the buckle guide 76 (the state shown in FIG. 3), the cover-side engagement portions 72 of the cover long-side wall portion 74 of the buckle cover 60 enter between the vehicle lower side surfaces of the guide-side engagement portions 100 of the guide long-side wall portion 98 of the buckle guide 76 and the outside surface of the guide long-side wall portion 98 of the buckle guide 76, and become sandwiched between the vehicle lower side surfaces of the guide-side engagement portions 100 and the guide long-side wall portion 98.

Moreover, the pair of guide ribs 70 of the guide long-side wall portion 74 of the buckle cover 60 are between the pair of guide-side engagement portions 100 of the guide long-side wall portion 98 of the buckle guide 76, and the buckle cover 60 can move in its longitudinal direction due to the guide ribs 70 of the buckle cover 60 being guided by the pair of guide-side engagement portions 100 of the buckle guide 76.

Furthermore, as shown in FIG. 6A, the reinforcement plate 92 embedded in the buckle guide 76 is, at the vehicle upper side end portion inside the guide long-side wall portions 96 and 98 of the buckle guide 76, bent outwards in the thickness direction of the buckle guide 76 and enters inside the guide-side engagement portions 100. Due to this, the rigidity of the guide-side engagement portions 100 is reinforced.

Operation and Effects of the Embodiment

In the seat belt device 10, when, for example, the door of the vehicle, corresponding to the seat 30 to which the seat belt device 10 is applied, changes from a closed state to an open state, this change in the opened/closed state of the door is detected by the detection component such as the door opening and closing detection component such as a courtesy switch. Furthermore, when, for example, an occupant 102 sits in the seat 30, the fact that the occupant 102 is sitting in the seat 30 is detected by the detection component such as the occupant detection component such as a load sensor provided in the seat cushion 48 of the seat 30. The level of the electrical signal that is output from the detection component(s) to the control unit is switched (changes) due to the change in the state of the door and/or the seat 30 as the occupant gets into the vehicle. Due to this, when the motor actuator 46 is driven and the drive screw 44 is rotated, the slider 52 is guided by the guide walls 40 and 42 of the frame 36 and slid in the vehicle rearward direction. Due to this, when the wire ropes 54 are moved in the direction of the longitudinal direction distal end side, the buckle body 66 is pushed obliquely upward in the vehicle forward direction by the wire ropes 54.

When the pushing force from the wire ropes 54 is transmitted via the buckle body 66 to the buckle cover 60, the guide ribs 70 of the cover long-side wall portions 68 and 74 of the buckle cover 60 are guided by the guide-side engagement portions 100 of the buckle guide 76, and the buckle cover 60 is moved obliquely upward in the vehicle forward direction (the direction of arrow A in FIG. 2). In this way, due to the buckle cover 60 being moved, the occupant 102 can easily engage the tongue 26 into the buckle 50 and can easily put on the webbing 18.

When the tongue 26 becomes engaged with the buckle 50, the level of the electrical signal that is output from the buckle switch of the buckle 50 to the control unit is switched (changes). Due to this, when the motor actuator 46 is driven and the drive screw 44 is rotated, the slider 52 is guided by the guide walls 40 and 42 of the frame 36 and slid in the vehicle forward direction. Due to this, when the wire ropes 54 are moved in the direction of the longitudinal direction base end side, the buckle cover 60 is pulled by the wire ropes 54 via the buckle body 66. Due to this, the guide ribs 70 of the cover long-side wall portions 68 and 74 of the buckle cover 60 are guided by the guide-side engagement portions 100 of the buckle guide 76, and the buckle cover 60 is moved obliquely downward in the vehicle rearward direction (the direction of arrow B in FIG. 3).

Figure 6B:
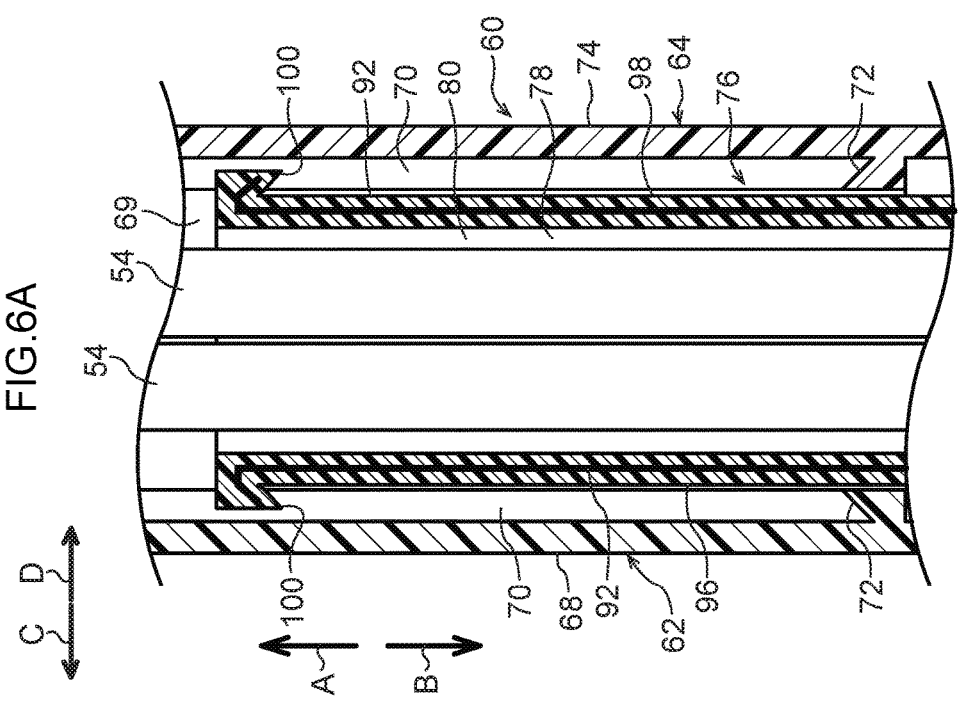

Here, when, as shown in FIG. 3, the buckle cover 60 reaches the moving endpoint on the vehicle upper side of the buckle guide 76, as shown in FIG. 6B, the cover-side engagement portions 72 of the cover long-side wall portion 68 of the buckle cover 60 enter between the vehicle lower side surfaces of the guide-side engagement portions 100 of the guide long-side wall portion 96 of the buckle guide 76 and the outside surface of the guide long-side wall portion 96 of the buckle guide 76, the cover-side engagement portions 72 of the cover long-side wall portion 68 become sandwiched between the guide-side engagement portions 100 of the guide long-side wall portion 96 and the guide long-side wall portion 96, and the vehicle upper side surfaces of the cover-side engagement portions 72 of the cover long-side wall portion 68 are brought into abutting with the vehicle lower side surfaces of the guide-side engagement portions 100 of the guide long-side wall portion 96.

Moreover, in this state, the cover-side engagement portions 72 of the cover long-side wall portion 74 of the buckle cover 60 enter between the vehicle lower side surfaces of the guide-side engagement portions 100 of the guide long-side wall portion 98 of the buckle guide 76 and the outside surface of the guide long-side wall portion 98 of the buckle guide 76, the cover-side engagement portions 72 of the cover long-side wall portion 74 become sandwiched between the guide-side engagement portions 100 of the guide long-side wall portion 98 and the guide long-side wall portion 98, and the vehicle upper side surfaces of the cover-side engagement portions 72 of the cover long-side wall portion 74 are brought into abutting with the vehicle lower side surfaces of the guide-side engagement portions 100 of the guide long-side wall portion 98.

Here, the directions of the vehicle upper side surfaces of the cover-side engagement portions 72 of the cover long-side wall portions 68 and 74 of the buckle cover 60 slope outward in the thickness directions of the buckle cover 60 and the buckle guide 76 relative to the longitudinal direction of the buckle cover 60 and the buckle guide 76. In contrast to this, the directions of the vehicle lower side surfaces of the guide-side engagement portions 100 of the guide long-side wall portions 96 and 98 of the buckle guide 76 slope inward in the thickness directions of the buckle cover 60 and the buckle guide 76 relative to the longitudinal direction of the buckle cover 60 and the buckle guide 76.

For this reason, due to the vehicle upper side surfaces of the cover-side engagement portions 72 of the buckle cover 60 being brought into contact with the vehicle lower side surfaces of the guide-side engagement portions 100 of the buckle guide 76, not only movement of the cover-side engagement portions 72 of the buckle cover 60 in the vehicle upward direction but also movement of the cover-side engagement portions 72 outward in the thickness directions of the buckle cover 60 and the buckle guide 76 is restrained by the guide-side engagement portions 100.

Due to this, even when the buckle cover 60 is pushed in the vehicle forward and rearward direction or the vehicle width direction, the state in which both of the cover-side engagement portions 72 of the buckle cover 60 are sandwiched between the guide-side engagement portions 100 of the buckle guide 76 and the guide long-side wall portions 96 and 98 of the buckle guide 76 can be maintained. Due to this, the buckle cover 60 can be effectively restrained from coming away from the buckle guide 76.

Moreover, the rigidity of both of the guide-side engagement portions 100 of the guide long-side wall portions 96 and 98 of the buckle guide 76 is reinforced by the reinforcement plate 92. For this reason, it is difficult for the guide-side engagement portions 100 to become deformed even when they are pushed by the cover-side engagement portions 72 of the buckle cover 60. For this reason, the state in which the both of the cover-side engagement portions 72 of the buckle cover 60 are sandwiched between the guide-side engagement portions 100 of the guide long-side wall portions 96 and 98 of the buckle guide 76 and the guide long-side wall portions 96 and 98 of the buckle guide 76 can be maintained, and the buckle cover 60 can be effectively restrained from coming away from the buckle guide 76.

Furthermore, the rigidity of the both of the guide-side engagement portions 100 of the buckle guide 76 is reinforced by the reinforcement plate 92. For this reason, even if the amount that the both of the guide-side engagement portions 100 extend from the vehicle upper side end portions of the guide long-side wall portions 96 and 98 of the buckle guide 76 is reduced, deformation of the both of the guide-side engagement portions 100 of the buckle guide 76 due to the pushing force from the cover-side engagement portions 72 of the buckle cover 60 can be prevented or controlled. Due to this, the buckle guide 76 can be made compact and smaller and also the buckle cover 60 can be made compact and smaller. Due to this, the space needed to install the buckle device 32 can be reduced.

Moreover, the cover-side engagement portions 72 of the buckle cover 60 are formed on the cover long-side wall portions 68 and 74 on both thickness direction sides of the buckle cover 60, and the guide-side engagement portions 100 of the buckle guide 76 are formed on the guide long-side wall portions 96 and 98 on both thickness direction sides of the buckle guide 76. For this reason, the range in which the cover-side engagement portions 72 and the guide-side engagement portions 100 are formed can be enlarged compared to a configuration where the cover-side engagement portions 72 are formed on the wall portion on the width direction side of the buckle cover 60 and the guide-side engagement portions 100 are formed on the wall portion on the width direction side of the buckle guide 76. Due to this also, the state in which the cover-side engagement portions 72 are sandwiched between the guide-side engagement portions 100 of the buckle guide 76 and the guide long-side wall portion 96 of the buckle guide 76 and in which the cover-side engagement portions 72 are sandwiched between the guide-side engagement portions 100 of the buckle guide 76 and the guide long-side wall portion 98 of the buckle guide 76 can be maintained, and the buckle cover 60 can be effectively restrained from coming away from the buckle guide 76.

Moreover, on the one thickness direction side of the buckle cover 60 and the buckle guide 76, the cover-side engagement portions 72 of the buckle cover 60 are sandwiched between the guide long-side wall portion 96 of the buckle guide 76 and the guide-side engagement portions 100 of the buckle guide 76, and on the other thickness direction side of the buckle cover 60 and the buckle guide 76, the cover-side engagement portions 72 of the buckle cover 60 are sandwiched between the guide long-side wall portion 98 of the buckle guide 76 and the guide-side engagement portions 100 of the buckle guide 76. Due to this, a vehicle forward and rearward direction load or vehicle width direction load applied to the buckle cover 60 can be received on both thickness direction sides of the buckle guide 76, deformation of the guide-side engagement portions 100 can be prevented or suppressed, and the buckle cover 60 can be restrained from coming away from the buckle guide 76.

In the present embodiment, the guide-side engagement portions 100 are formed on both the guide long-side wall portion 96 and the guide long-side wall portion 98 of the buckle guide 76, and the cover-side engagement portions 72 are formed on both the cover long-side wall portion 68 and the cover long-side wall portion 74 of the buckle cover 60. However, the guide-side engagement portions 100 may be formed on one of the guide long-side wall portion 96 and the guide long-side wall portion 98 of the buckle guide 76, and the cover-side engagement portions 72 may also be formed on one of the cover long-side wall portion 68 and the cover long-side wall portion 74 of the buckle cover 60 so as to correspond to the positions in which the guide-side engagement portions 100 are formed.

Furthermore, in the present embodiment, the guide-side engagement portions 100 are formed on the guide long-side wall portions 96 and 98 of the buckle guide 76, and the cover-side engagement portions 72 are formed on the cover long-side wall portions 68 and 74 of the buckle cover 60. However, the guide-side engagement portions 100 may be formed on at least one of the guide short-side wall portion 86 and the guide short-side wall portion 94 of the buckle guide 76, and the guide-side engagement portions 72 may be formed on the cover short-side wall portion 69 and/or 75 of the buckle cover 60 so as to correspond to the positions in which the guide-side engagement portions 100 are formed.

Moreover, in the present embodiment, the cross-sectional shapes of the buckle cover 60 and the buckle guide 76 as cut in a direction orthogonal to the longitudinal direction of the buckle cover 60 and the buckle guide 76 are substantially rectangular, but the cross-sectional shapes of the buckle cover 60 and the buckle guide 76 may be shapes other than rectangular, such as circular, elliptical, or square.

Moreover, in the present embodiment, the rigidity of the guide-side engagement portions 100 of the buckle guide 76 is reinforced by the reinforcement plate 92, but the reinforcement plate 92 does not have to be embedded inside the guide-side engagement portions 100.

Furthermore, in the present embodiment, the buckle guide 76 serving as a support member enters the inside of the buckle cover 60 serving as a moving member, but the moving member may enter the inside of the support member.

Moreover, in the present embodiment, the moving direction of the buckle cover 60 serving as a moving member relative to the buckle guide 76 serving as a support member is obliquely upward in the vehicle forward direction (the direction of arrow A in FIG. 2 and FIG. 3) and obliquely downward in the vehicle rearward direction (the direction of arrow B in FIG. 2 and FIG. 3). However, the moving direction of the moving member relative to the support member may be for example in the vehicle forward and rearward direction, the vehicle upward and downward direction, or the vehicle width direction. That is to say, the moving direction of the moving member relative to the support member is not particularly limited.

Furthermore, in the present embodiment, due to that the buckle cover 60 serving as a moving member is moved relative to the buckle guide 76 serving as a support member, the buckle 50 is moved together with the buckle cover 60. However, the configuration that is moved together with the moving member by the movement of the moving member relative to the support member is not limited to the buckle 50. For example, the tongue 26 may be moved in the vehicle forward direction or the vehicle upward direction by the movement of the moving member relative to the support member.

Moreover, in the present embodiment, the control of the motor actuator 46 for causing the buckle cover 60 to move obliquely upward in the vehicle forward direction is performed on the basis of switch (change) in the level of the electrical signal that is output from the detection component such as the door opening and closing detection component such as a courtesy switch and/or the occupant detection component that detects that the occupant 102 is sitting in the seat 30.

However, the control of the motor actuator 46 is not limited to a configuration based on switch (change) in the level of the electrical signal that is output from the door opening and closing detection component and/or the occupant detection component. For example, the control of the motor actuator 46 may be performed on the basis of an unlock operation that unlocks (releases) a door lock when the occupant 102 gets into the vehicle. Moreover, an operation switch of the motor actuator 46 for unlocking the door lock may be provided in the vehicle cabin or a remote control key for the vehicle, so that the control of the motor actuator 46 for causing the buckle cover 60 to move obliquely upward in the vehicle forward direction is performed as a result of the operation switch being operated by the occupant 102.

That is, it suffices for the control of the motor actuator 46 for causing the buckle cover 60 to move obliquely upward in the vehicle forward direction to be based on an operation with respect to parts of the vehicle when the occupant 102 gets into the vehicle.

What is claimed is:

1. A seat belt device comprising:
    a buckle with which a tongue provided at a webbing is engaged;
    a moving member that is movable together with the tongue or the buckle;
    a support member that movably supports the moving member; and
    a restraining portion that is a one side engagement portion that protrudes from one of the moving member or the support member toward a side of the another of the moving member or the support member,
    an another side engagement portion that is provided at the another of the moving member or the support member, the another side engagement portion protruding from the another of the moving member or the support member toward a side of the one of the moving member or the support member;
    the one side engagement portion and the another side engagement portion being provided so as to face each other in a moving direction of the moving member;
    the restraining portion and the one of the moving member or the support member sandwiching another of the moving member or the support member to thereby restrain the moving member from coming away from the support member in a case in which the moving member reaches a moving endpoint of the moving member, and
    in the case in which the moving member reaches the moving endpoint of the moving member, the one side engagement portion and the one of the moving member or the support member sandwich the another side engagement portion in a direction perpendicular to the moving direction of the moving member,
    wherein the one side engagement portion has one side abutting face and the another side engagement portion has another side abutting face the one side abutting face and the another side abutting face facing in both of the moving direction and the direction perpendicular to the moving direction in the case in which the moving member reaches the moving endpoint of the moving member,
    the one side abutting face and the another side abutting face being separated from one another in a case in which the moving member does not reach the moving endpoint of the moving member,
    the one side abutting face and the another side abutting face being abutted to one another in the direction perpendicular to the moving direction in a case in which the moving member does reach the moving endpoint of the moving member.

2. The seat belt device of claim 1, further comprising a reinforcement member that is provided in the restraining portion and reinforces the restraining portion.

3. The seat belt device of claim 2, wherein:
    a short portion and a long portion whose dimension in a direction orthogonal to a moving direction of the moving member is longer than that of the short portion are provided at the one of the moving member or the support member; and
    the restraining portion is provided at the long portion.

4. The seat belt device of claim 3, wherein restraining portions are provided at a pair of long portions respectively.

5. The seat belt device of claim 2, further comprising a guide member that is engaged with the restraining portion and guides the moving member.

6. The seat belt device of claim 1, wherein:
a short portion and a long portion whose dimension in a direction orthogonal to a moving direction of the moving member is longer than that of the short portion are provided at the one of the moving member or the support member; and
the restraining portion is provided at the long portion.

7. The seat belt device of claim 6, wherein restraining portions are provided at a pair of long portions respectively.

8. The seat belt device of claim 1, further comprising a guide member that is engaged with the restraining portion and guides the moving member.

* * * * *